United States Patent [19]
Souris

[11] Patent Number: 6,060,798
[45] Date of Patent: May 9, 2000

[54] STRAIGHT MOTION

[76] Inventor: Nicholas Souris, 323 Hurt Rd. SW., Smyrna, Ga. 30082

[21] Appl. No.: 09/261,675

[22] Filed: Mar. 3, 1999

Related U.S. Application Data

[60] Provisional application No. 60/106,207, Oct. 30, 1998.

[51] Int. Cl.[7] .................................................. H02K 41/00
[52] U.S. Cl. .............................................. 310/14; 310/12
[58] Field of Search .................................. 310/12, 13, 14, 310/23, 34, 42; 104/290, 292, 294; 335/250, 266, 282

[56] References Cited

U.S. PATENT DOCUMENTS

| | | | |
|---|---|---|---|
| 4,634,126 | 1/1987 | Kimura | ................................. 336/77 X |
| 5,134,326 | 7/1992 | Sakamoto | ................................. 310/14 |
| 5,600,189 | 2/1997 | Van Geel et al. | .................... 310/12 X |

*Primary Examiner*—Nestor Ramirez
*Assistant Examiner*—Judson H. Jones

[57] ABSTRACT

A method of winding an electromagnetic coil creating a slot on the side of the winding, in order to allow a space for the plunger support to slide through the coil. Such an arrangement will permit the plunger to be permanently mounted, not movable and allow the coil to travel over the plunger and past it in either direction.

Thus by installing a series of plungers and their supports aligned in a straight line, said coil(s) can be moved over the plunger or plungers by sequential energezation and thus create a linear motion, or otherwise referred here as "straight motion".

16 Claims, 4 Drawing Sheets

CROSS SECTION   SIDE VIEW   MIDDLE SECTION   PLUNGERS

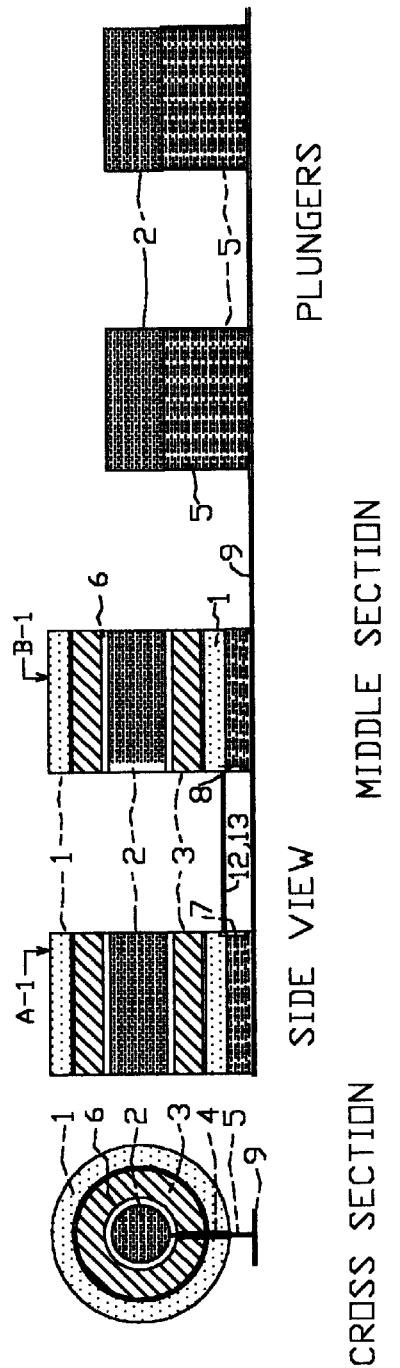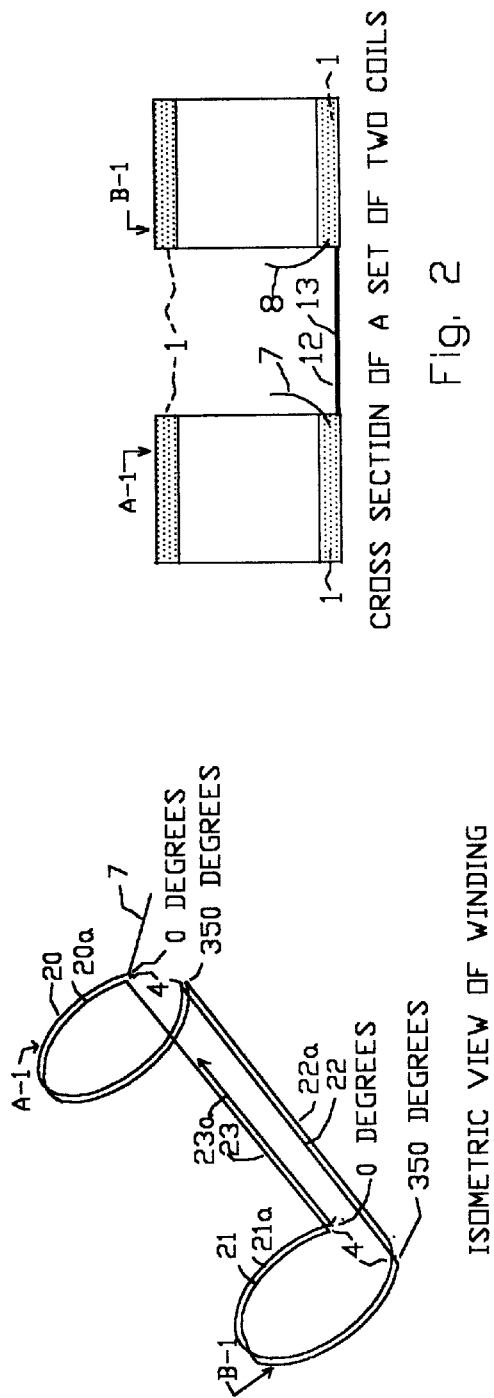

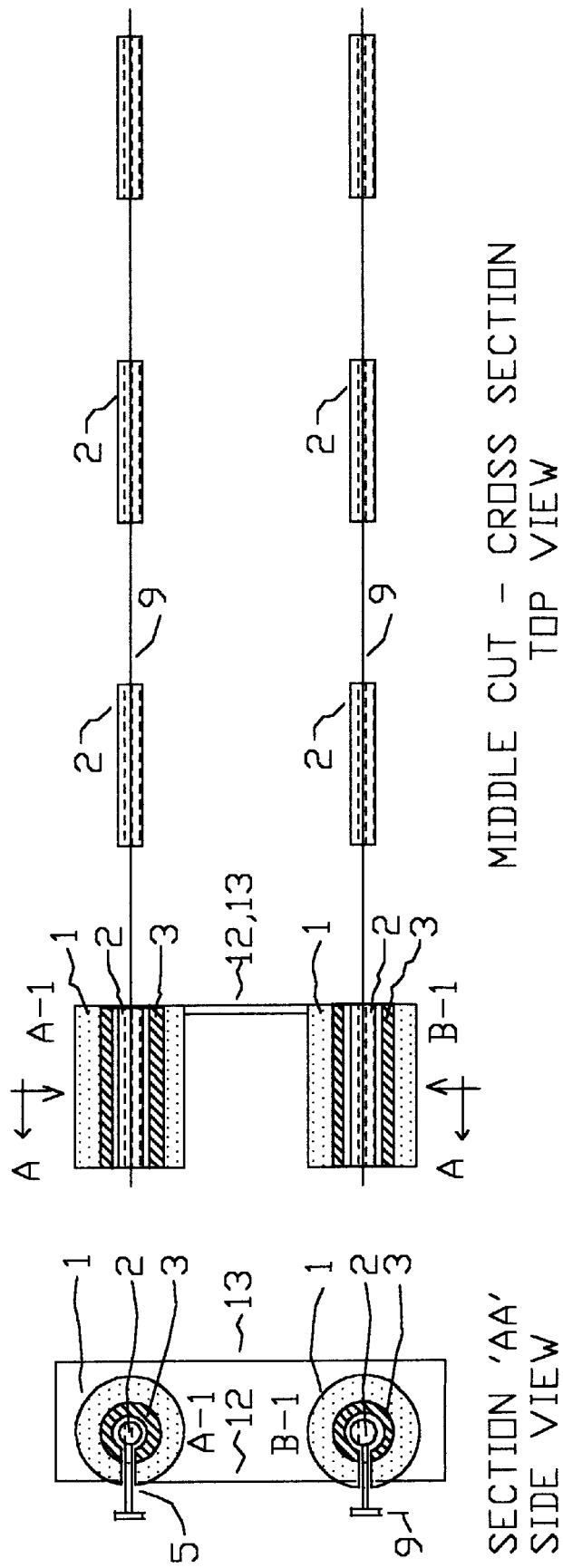

STRAIGHT MOTION

This application claims the benefit of Provisional Patent Application Ser. No. 60/106,207, filed Oct. 30th, 1998.

FIELD OF INVENTION

This invention relates in general to an electromagnetic coil design for moving a coil and a plunger in the magnetization field produced by the coil when energized, thus creating motion between coil and plunger.

More particularly, the invention pertains to a plunger that is permanently supported on a fixed position and a specially designed coil (electromagnetic coil) provided with a slot on the side of its winding that will permit the coil to travel over the plunger and more particularly over the plunger support, thus the coil could travel over the plunger and past it, in either direction.

This invention shows a design of a coil winding in such a manner as to produce the desired slot and the coil being capable of creating a magnetic flux to create a pull between coil and plunger. In this description the coil ferrous core should be designed with the same size slot as the winding of the coil, in order to accommodate the plunger support to slide through.

Therefore in this design the winding of the coil which normally is of a circular shape also known as ampere-turn, is not carried totally around in 360 degree circle (ampere-turn), but few degrees short of that, so that it can create the desired slot in order to permit the plunger support to slide in between. Thus allowing the coil, to move over the plunger, in its maximum magnetic field, once the coil is energized. In this case the plunger will be permanently supported, and the coil when magnetized will be free to move over the plunger.

In an electromagnetic field a number of ampere turns are needed, such design was understood to wind an electric wire in circular pattern and once energized it will create an electromagnetic field that can magnetize a ferrous core and with the appropriate energy and force to pull a ferrous plunger in its magnetic field.

However such an arrangement will obstruct a coil to slide past the plunger, due to a plunger support, and thus mostly it has been the practice to pull a plunger into a coil. Therefore in this design the plunger is stationary and the coil will move over and around the plunger and pass it in either direction. With this arrangement the coil could move from one plunger to another and so on, in a straight line, thus causing a straight motion.

This is accomplished by winding the turns, known as "ampere turns" short of a complete 360 degrees circle in order to create a slot (gap) in the winding. Thus by wiring one open loop at time and direct the wire away from that first open loop and start a second open loop in the opposite direction and return back to the first open loop and add a second open loop similar and parallel to the first one and then again run the wire away to the second opposite loop, and run a second loop similar and parallel to the second loop and by repeating this process back and forward, two coils are created with the same number of open loops and respective slot in the winding of each of these two coils, which will constitute one device. These two coils should be wired and maintained at a certain distance so their magnetic fields do not interfere with each other.

Claim One Description.

Such a slot of few degrees will still permit this type of coil to produce a magnetic field capable of pulling a ferrous plunger in its field; thus energy is produced and hence the basis of this invention.

OBJECTS OF THE INVENTION

The primary object of this invention is to create an electromagnetic coil suitable to slide over a plunger and pass it in either direction, thus the coil can travel over a series of plungers, and so creating a straight or linear motion, perpetual, that can also be reversed in direction if so desired. In addition to be able to create a reciprocating motion.

SUMMARY OF THE INVENTION

An electromagnetic device referred here as "a set of two coils", where upon the winding starts at the 0 degree point of a cylindrical shape circle and runs short of completing a 360 degrees circle of that cylinder and in this case stops, and for purpose of illustrating the design lets assume at 350 degrees point of that circle, at that point the wire is directed away along that cylindrical shape and starts a second winding, beginning at 350 degree point and stops to 0 degree point, compared in relation to the first winding. At that point the wire is directed back to the first winding and runs from the 0 degree point to the 350 degree point, creating a second loop, similar and parallel to the previous winding, and then back to the second winding adding a second loop similarly. Thus by repeating this pattern of winding, and going back and forward, two coils are created, each having a slot opening and in this case of about 10 degrees, This slot should be made large enough to permit the coils to slide over the plunger's support, and small enough so an electromagnetic flux is produced capable to pull over the plunger. This design will permit the electromagnetic coils to pass the plunger on either direction. Also the physical distance between the two coils should be sufficient so the electromagnetic flux created by each coil does not neutralize or effect each other.

This design will permit the creation and manufacturing of a device that can produce energy in a straight motion at a very efficient manner and cost compared to a rotary energy produced and then converted to a straight motion as presently known.

THE DRAWINGS

The invention, both as to its arrangement and mode of operation, can be more fully understood from the exposition which follows when it is considered in conjunction with the accompanying drawings in which FIG. 1 shows a cross section cut and a side view of the coil and plunger and the plunger support.

FIG. 2 shows a side view of the two coil winding arrangement.

FIG. 3 shows an isometric view of the wiring of a set of two electromagnetic coils and creating a slot in the windings.

FIG. 5 shows a top view of two straight parallel lines of plunger and a set of two coils, each coil riding over one of the two plunger lines.

DESCRIPTION OF THE PREFERRED EMBODIMENTS

Figure 1C:
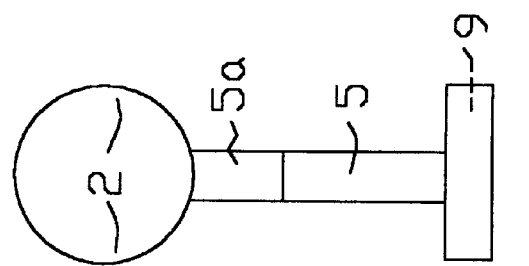
FIG. 1c shows a section of the plunger along with its support and rail.

Referring now more particularly to the drawings, in which a preferred embodiment of the invention is illustrated: FIG.

3, wire #7 will start the coil and also serves as one of the terminals of the coil, section #10 is the wire continuing in a circular fashion of a desired radius, however it will stop short of completing a 360 degrees circle, for the purpose of demonstrating this design, lets assume it stops at 350 degrees, thus forming an open loop so far, at this point the wire is bent 90 degrees and is run as shown by #12, away from this loop, lets assume a distance of 4". At that point the wire is bent 90 degrees again in the opposite direction of wire #10 and a new section of winding #11 is created, said winding starts at the 350 degree point and is run, in a circular fashion, to the 0 degree point, creating an open loop again in opposite direction of winding loop #10, at that point the wire is bent again at 90 degrees as shown by #13 and directed towards the first winding labeled #10 and when it reaches that point is bent at 90 degrees again and starts the second loop, parallel and same as #10, labeled loop #10a.

Thus by continuing this method of winding as described so far, by adding windings on along and in parallel with loops #10 and #11, such as loops, 10a & 11a, 10b & 11b, 10c and 11c, and so on, two coils are formed, winded in opposite directions and both maintaining an assumed 10 degrees slot (gap) #4 and the winding is terminated at the second terminal #8 not shown in FIG. 3 but in FIG. 1. These two coils will be always switched together as being one device and will create two electromagnetic coils of opposite characteristics in reference of magnetization and they will be referred here as a "set of two coils".

By switching power to the terminals, the set of two coils are magnetized simultaneously, capable of pulling over two ferrous plungers, thus causing motion and energy. The advantage of these coils is that they can travel over the plungers and continue in either direction past the plungers. In this case the plungers are permanently supported by preferably non ferrous material, past the coil's ferrous core slot (gap) #4, that might prove better to be ferrous also, referred here in FIG. 1 as support #5, and a ferrous section #5a. Once the winding is de-energized, the coils can be pulled away from the plungers in either direction, thus if we where to have a number of plungers installed in a straight line and supported permanently as shown by rail #9 as described previously and by positioning additional set of coils, at least two or more in such reference to the plungers and by energizing said coils that are all attached to the same load or body, and by designing the positioning or spacing of the plungers and the coils in respect to each other and by switching each set of two coils in a certain time sequence and frequency, said load will move along the series of plungers. This will be further clarified by referring to drawing FIG. 4 and its functional description. If the coils are supporting a load, such as a cage, said cage will move accordingly.

The distance of the harness labeled as #12 and #13 should be great enough so magnetic fields that are produced from winding #10 and winding #11 do not interfere with each other, with the possibility of neutralizing their magnetic fields.

FIG. 1 shows a cross section and a side view of a coil and plunger arrangement for the purpose of identifying the parts involved in this "set of two coils".

1 represent the coil windings, referred here as coil A-1 and B-1.

2 represents the plunger.

3 represents the coil ferrous core with a gap similar to and aligned to the coil winding #1.

4 represents the gap or otherwise referred here also as 'slot', created by the coil winding and fabricated on the coil's ferrous core, in order to allow passage of the plunger support.

5 represent the plunger support.

6 refers to the gap between the coil and the plunger.

7 represents one of the coil terminals

8 represents the second coil terminal

9 represents a rail supporting the plungers

10 refers as the first loop in the winding of coil A-1

11 refers as the first loop in the winding of coil B-1

12 refers to the starting wiring between coils A-1 and B-1

13 refers to the first return wiring between coils B-1 and A-1 Items 10,11,12, & 13 are repeated over and over, indicated by adding a suffix a, b, c, etc., thus creating the windings of the two coils referred here as "A" & "B" and their wiring harnesses between the two coils.

Figure 1B:
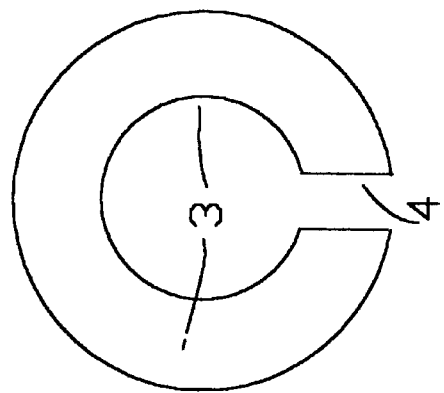
FIG. 1b shows a section of coil ferrous core.
Figure 1A:
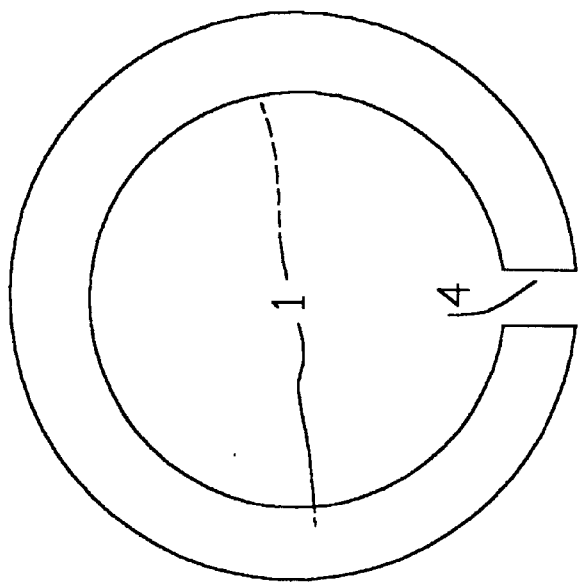
FIG. 1a shows a section of the coil.

FIG. 1a shows a cross section of coil winding #1, as well as slot #4.

FIG. 1b shows a cross section of coil ferrous core #3, as well as slot #4.

FIG. 1c shows a cross section of plunger #2, along with plunger support #5, which in this case a portion of it, facing coil ferrous core #4 is further identified as #5a and identified as being of ferrous material.

FIG. 2 shows a side view of a set of two coil windings, without showing any plungers and the coil's ferrous cores.

7 represent the starting terminal of the two coils.

8 represents the ending terminal after all the coil windings are made.

A-1 represent the winding of the first coil of a "set of two coils".

B-1 represents the winding of the second coil of a "set of two coils".

Figure 4:
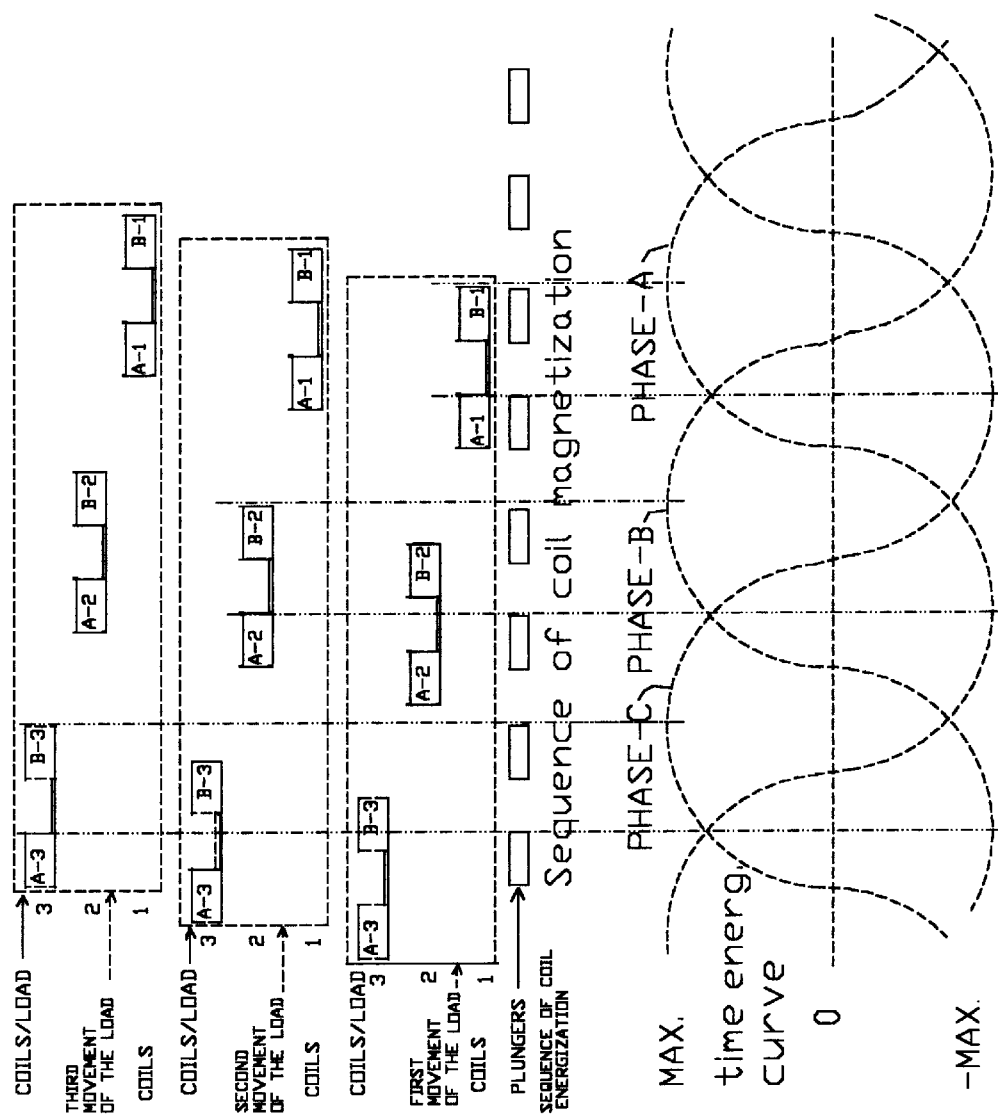
FIG. 4 shows a series of plungers and three sets of two coils and a sequence switching arrangement.

Referring to the above drawings and descriptions the function of the device is thus illustrated. FIG. 4, shows an example with three "sets of two coils" labeled A-1 & B-1, A-2 & B-2, A-3 & B-3, all these coils are mounted on the same load to be carried by the electromagnetic forces to be produced. Said set of coils are energized in sequence 1 through 3, each set to move the load 213 the length of the plunger distance. In this case the distance of the plungers is the same as the length of the plunger and coils. The first line represent the set of coils A-1 & B-1 being energized first, the second line represents the set of coils A-2 & B-2 being energized second and the third line represents the set of coils A-3 and B-3 being energized third; and in each case FIG. 4 shows the relative position of the coils in reference to the plungers. Each set of coils will move ⅔ the unit distance referred and being here the plunger length. The same function can be repeated over and over again by means of switching said set of coils and at this specific sequence; thus creating a perpetual linear movement of the load connected to these three sets of coils, said speed of the movement will depend very much on the frequency and sequence of switching these three sets of coils and energy naturally will depend on the size of the coils and other factors.

A three phase 60 cycle alternating current could provide such power to the above listed three "sets of two coils" with each electrical power phase connected respectively to each set of two coils and thus, when it energized, will create such motion as described above. Wherein if this load was to be a moving platform and in addition if the design has two parallel, identical lines of plungers, as shown on FIG. 5 and then each coil of the "set of two coils" is installed over each of these two lines of plungers, the platform will have a more stable motion. Naturally said platform should be designed with the additional requirement of a moving vehicle.

Conclusion, Ramifications, and Scope

Thus it is clear that this invention provides means to design a device, simple to produce, efficient, reliable, economical, maintaining a clean environment compared to devices of equal functions.

Efficiency: Linear energy is produced versus rotary, which the later, has to be converted. The amount of power requirement can be accomplished by the number and size of coils used versus different sizes of motors suitable for a specific load, it is intermittently powered, therefore easier to dissipate heat.

Each unit can be self powered.

Reliability: No moving parts, speed is direct product of electrical power and switching frequency, producing an accurate speed, quick acceleration and deceleration controlled by varying frequency, eliminating mechanical and hydraulic brake systems. This device, due to its simplicity, can reach high speeds, since mechanical limitations are fewer.

Flexibility in use: energy and amount consumed depends basically only when in use, by adding or removing self powered units.

Also free from gasoline engine exhaust gases environmental pelusion.

For example a train consist of locomotive(s) and wagon(s)

Each locomotive can pull a definite number of wagons, thus if all wagons are not needed the efficiency is dropped.

In this case each wagon is self powered, with a specific number of coils, to carry a maximum load, thus by adding or subtracting wagons on a train a very controlled efficiency is obtained.

I claim:

1. An electromagnetic coil for producing energy comprising:
   a. a plunger
   b. a plunger support
   c. an electromagnetic coil, wherein the coil is formed with a number of open-loops forming the required and so called "amperes-turns" required in the design of a coil to produce an electromagnetic flux, said open loops form a slot in the coil winding offering means for said coil to slide over the plunger and more particularly the plunger support and pass said plunger in either direction, wherein said open loops are created by directing the wiring at the end of each open loop away from the loop reversing its direction of winding and returning at the other end of the open loop starting the next open loop winding, and by repeating this process, a coil is produced with the required number of open loops creating the required slot for the coil to slide over the plunger support.

2. The electromagnetic coil of claim 1 further including said wiring when directed away from each open loop reverses its direction by creating a similar open loop in the opposite direction and then return to the first winding to start the next open loop, and by repeating said process, a second coil is produced, similar to the first coil with an open slot winding, winded however in the opposite direction, thus creating one device consisting of two open loop coil windings, and having opposite magnetic characteristics.

3. The electromagnetic coil of claim 1 further including a ferrous core is added to said coil and is designed with a slot similar and in line with the coil's slot winding.

4. The electromagnetic coil of claim 1 wherein the plunger support section that slides between the coil ferrous core is also of ferrous material.

5. The electromagnetic coil of claim 1 wherein the distance between said set of two coils should be great enough so their respective electromagnetic fields do not interfere with each other.

6. The electromagnetic coil of claim 1 wherein the shape of said coil could be circular, elliptical and other experimental shapes, provided always they have a slot, which will allow it to travel over a plunger support.

7. The electromagnetic coil of claim 1 wherein a plurality of said coils when mounted on one platform hereby referred as load and said coils directed to slide over a straight line of plungers at certain distances between each other and with their supports being on a straight line also, and by means of energizing said electromagnets in a sequential switching arrangement, the load will be able to travel over said plungers at speeds, power and other factors totally related to the design and function of said components.

8. The electromagnetic coil of claim 1 and claim 2, wherein two lines of plungers parallel and similar to each other are installed and each coils of said set of two coils is installed over each of said plunger lines, such arrangement will create a more stable motion for the load.

9. A vehicle producing a straight motion comprising:
   (a) The plurality of electromagnetic coils of claim 7,
   (b) The plurality of plungers of claim 7,
   (c) an electrical power control mechanism wherein means of alternate power source is used to energize said coils thus producing energy pull between coils and plunger in a sequential linear motion, based on the frequency of energization.

10. A vehicle producing a straight motion comprising:
    (a) The plurality of electromagnetic coils of claim 8,
    (b) The plurality of plungers of claim 8,
    (c) an electrical power control mechanism further including means of alternate power source used to energize said coils, thus producing energy pull between said coils and said plungers in a sequential linear motion based on the frequency of energization.

11. An electromagnetic coil for producing a linear motion comprising:
    a. a ferrous plunger,
    b. a plunger support,
    c. a coil winding consisting of a number of open loops turns creating a slot opening in its circular shape, said open loop being created by directing the wiring away at the end of each said open loop reverse the wiring direction and return to the other end of said open loop, thus starting the next open loop winding, and so on, until a coil is formed with a slot formed in its winding, based on the space formed by said open loop winding wherein said slot opening in the coil winding is formed in order to provide means for said coil to slide over said plunger support and past it in either direction.

12. The electromagnetic coil of claim 11 wherein said wiring when directed away from each open loop reverses its direction by creating a similar open loop in the opposite direction and then return back to the other end of the open loop of the first winding to start the next open loop, and then back to said opposite direction open loop adding the next open loop, and by repeating said process until the required ampere-turns are winded, a second coil is produced similar to the first coil with an open slot winding, winded however in the opposite direction, thus creating one device comprising of two open loop coil windings, and having opposite magnetic characteristics.

13. The electromagnetic coil of claim 12 wherein the distance between said set of two coils should be great enough so their respective electromagnetic fields do not interfere with each other.

14. The electromagnetic coil of claim 11 and claim 12 wherein two lines of plungers parallel and similar to each other are installed and each coil(s) of said set of two coils is installed over each of said plunger lines, such arrangement will create a more stable motion for the load.

15. The electromagnetic coil of claim 14 wherein a plurality of coils mounted on the same support could travel over a plurality of plungers stationary installed in a straight line installed a certain distance between each other and having their supports in a straight line also, and by means of sequential switching said coils could travel over the plungers, thus creating a linear motion and in a controllable direction.

16. The vehicle producing a straight motion of claim 15 comprising:
   (a) a plurality of electromagnetic coils,
   (b) a plurality of plungers,
   (c) an electrical power control mechanism further including means of alternating power source used to energize said coils, thus producing energy pull between coils and plungers in a sequential linear motion, based on the frequency of energizations.

* * * * *